United States Patent
Kesti et al.

(10) Patent No.: US 10,814,640 B2
(45) Date of Patent: Oct. 27, 2020

(54) METHOD FOR IMPROVING DURABILITY OF INK JET PRINTED INK

(71) Applicant: 3M INNOVATIVE PROPERTIES COMPANY, St. Paul, MN (US)

(72) Inventors: Michael R. Kesti, Minneapolis, MN (US); Bruce A. Nerad, Oakdale, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 15/544,646

(22) PCT Filed: Jan. 14, 2016

(86) PCT No.: PCT/US2016/013357
§ 371 (c)(1),
(2) Date: Jul. 19, 2017

(87) PCT Pub. No.: WO2016/118397
PCT Pub. Date: Jul. 28, 2016

(65) Prior Publication Data
US 2017/0368837 A1    Dec. 28, 2017

Related U.S. Application Data

(60) Provisional application No. 62/105,489, filed on Jan. 20, 2015.

(51) Int. Cl.
| | | |
|---|---|---|
| *B41J 2/21* | (2006.01) |
| *C09D 11/40* | (2014.01) |
| *C09D 11/54* | (2014.01) |
| *C09D 11/00* | (2014.01) |
| *C09D 11/30* | (2014.01) |
| *B41M 5/50* | (2006.01) |

(52) U.S. Cl.
CPC ............ *B41J 2/2114* (2013.01); *B41M 5/502* (2013.01); *C09D 11/00* (2013.01); *C09D 11/30* (2013.01); *C09D 11/40* (2013.01); *C09D 11/54* (2013.01)

(58) Field of Classification Search
CPC ....... B41J 2/2114; B41M 5/502; C09D 11/00; C09D 11/30; C09D 11/40; C09D 11/54
USPC ......................................................... 347/105
See application file for complete search history.

(56) References Cited

U.S. PATENT DOCUMENTS

| | | | | |
|---|---|---|---|---|
| 7,169,444 | B2 * | 1/2007 | Onishi | B41J 11/0015 347/105 |
| 2002/0015085 | A1 * | 2/2002 | Moriyama | B41J 2/2114 347/101 |
| 2003/0021961 | A1 | 1/2003 | Ylitalo | |

(Continued)

FOREIGN PATENT DOCUMENTS

EP    1243435    9/2002

OTHER PUBLICATIONS

International Search Report for PCT International Application No. PCT/US2016/013357, dated Apr. 15, 2016, 4 pages.

*Primary Examiner* — Huan H Tran
*Assistant Examiner* — Alexander D Shenderov
(74) *Attorney, Agent, or Firm* — Daniel J. Iden

(57) ABSTRACT

Ink jet technology is used to deposit an ink stabilizing agent at the time of ink deposition (printing), upon a substrate. The stabilizing agent and the ink mix on the substrate. The amount of stabilizing agent is varied based on the needs of the inks being printed.

11 Claims, 1 Drawing Sheet

(56) References Cited

U.S. PATENT DOCUMENTS

| | | | |
|---|---|---|---|
| 2003/0064206 A1* | 4/2003 | Koyano | B41M 5/0017 |
| | | | 428/195.1 |
| 2005/0007431 A1* | 1/2005 | Koyano | B41M 5/0017 |
| | | | 347/95 |
| 2005/0270351 A1* | 12/2005 | Mouri | B41J 2/0057 |
| | | | 347/103 |
| 2013/0033039 A1 | 2/2013 | Gordillo | |
| 2013/0222502 A1 | 8/2013 | Kobayashi | |

* cited by examiner

METHOD FOR IMPROVING DURABILITY OF INK JET PRINTED INK

CROSS REFERENCE TO RELATED APPLICATIONS

This application is a national stage filing under 35 U.S.C. 371 of PCT/US2016/013357, filed Jan. 14, 2016, which claims the benefit of U.S. Provisional Application No. 62/105,489, filed Jan. 20, 2015 the disclosure of which is incorporated by reference in its/their entirety herein.

BACKGROUND

Image graphics are omnipresent in modern life. Images and data that warn, educate, entertain, advertise, etc. are applied on a variety of interior and exterior, vertical and horizontal surfaces. Nonlimiting examples of image graphics range from advertisements on walls or sides of trucks, to posters that advertise the arrival of a new movie, to warning signs near the edges of stairways.

Image graphics are increasingly made using digital techniques. A popular digital technique is ink jet printing. The use of thermal and piezo ink jet inks have greatly increased in recent years with accelerated development of inexpensive and efficient ink jet printers, ink delivery systems, and the like.

Ink jet hardware is commercially available from a number of multinational companies, including without limitation, Hewlett-Packard Company of Palo Alto, Calif., USA; Epson America, Inc., Long Beach, Calif. USA; and Mimaki Engineering Co., Ltd. of Tokyo, Japan. The number and variety of printers changes rapidly as printer manufacturers are constantly improving their products for consumers. Printers are made both in desk-top size and wide format size depending on the size of the finished image graphic desired. Nonlimiting examples of popular commercial scale thermal ink jet printers are the HP DesignJet and Latex printers.

Image quality is a foremost requirement of most image graphics—it is what the viewing public and paying customers will want, and demand to see. Other requirements for image graphics arise from various points in the process that takes a graphic image from concept to reality—e.g., the artist that produced the image graphic, or the print shop that printed it, or the installer that installed it. Exposure to the environment can place additional demands on the media and ink (depending on the application of the graphic).

For image graphics requiring very high durability, clear overlaminates are adhered to, or clear coatings cover, the image graphic. Overlaminate films or clear coatings (also known as "clears" in the graphics industry) are expensive to produce and are limited in types of materials because of the clarity required for the exposed layer in the final, protected image graphic. Overlaminates and clears need the same environmental protection as the remainder of the graphic and often require more intense protection because of the purpose of the overlaminate or clear to protect, and the requirement of continued clarity during image graphic placement for long durations of time.

SUMMARY

Methods for improving the durability of inks printed on a substrate via ink jet technology. A stabilizing agent is deposited, in varying relative amount, onto the substrate before or in concurrent with the printing of the ink, allowing the ink and the stabilizing agent to mix on the substrate at the time of printing. The amount of stabilizing agent applies may vary as a function of the particular inks being applied to the substrate, with areas associated with inks more susceptible to weathering receiving more stabilizing agent.

In one embodiment, a method of improving the performance of an ink jet printed ink that is applied to a substrate having first and second major surfaces is described, comprising applying, using a first ink jet print head, ink stabilizing agent to a first print area on the first major surface of the substrate; applying ink to the first print area.

In another embodiment, a method of improving the performance of an ink jet printed ink that is applied to a substrate is described, the method comprising using ink jet technology, applying a first amount of ink stabilizing agent to a first print area associated with a first color; using ink jet technology, applying a second amount of ink stabilizing agent to a second print area associated with a second color; printing, using ink jet technology, the first color in the first print area and the second color in the second print area.

In another embodiment, an ink jet printed article is described, the article comprising a first area on the printed surface wherein a stabilizing agent and a separate ink have been deposited according to an ink jet process.

These and other embodiments are further described herein.

DRAWINGS

DETAILED DESCRIPTION

Figure 1:
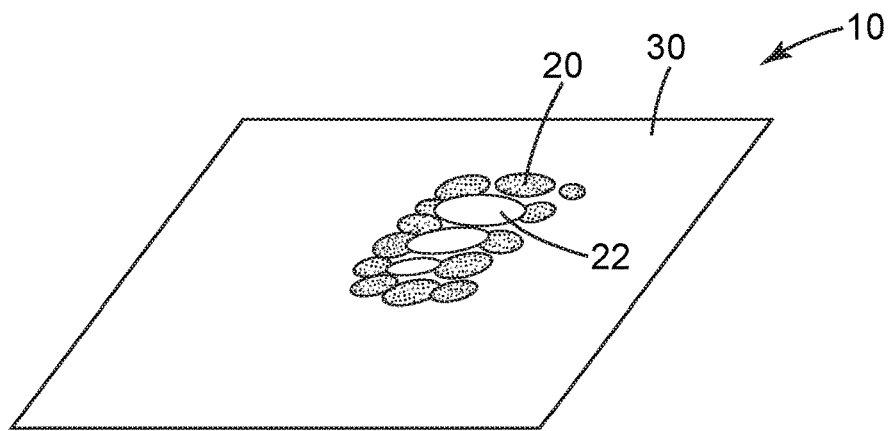
FIG. 1 is a drawing of a substrate printed with an ink stabilizing agent and an ink.

Image graphics must be durable in their intended environment over their expected life. For example, it is expected that an outdoor image graphic adhered to the side of a tractor semi must maintain its image quality for as much as seven to ten years, while the trailer travels through all types of inclement and sometimes brutal weather conditions. Often, it is a combination of ultra-violet light, heat, humidity, cold, wind, maintenance operations (washing), and other environmental extremes that causes a beautiful image to fade or succumb to other weathering effects.

Stabilizing agents (e.g., ultra-violet light absorbers, ultra-violet light stabilizers, antioxidants, heat stabilizers, and a variety of other additives) are often included in receptor media compositions and occasionally directly in the ink jet ink to protect those media and the image on those media from weathering effects. The amount of the stabilizing agent so incorporated can be limited by the composition or thickness of the film/membrane or solubility/compatibility of the stabilizing agents. This limit may be less than that required for the intended life of the graphic.

When incorporated into inks themselves, stabilizing agents may not be compatible with the ink in sufficient quantity to protect the graphic, or may cause problems with the basic properties of the ink itself; that is, such materials may not dissolve in the ink, or they may cause the colorant in an ink to precipitate or agglomerate, or the enhancement materials may cause the ink to polymerize, or limit the shelf-life/shelf-stability of the ink. Also, incorporation of a stabilizing agent into the ink at the time of its manufacture may require undesirable trade-off in other ink properties. This is particularly true when the ink has a specified viscosity requirement, such as typically encountered with ink jet inks. A specific example of a problem encountered is the increase of an ink jet ink viscosity upon heat aging (an indication of poor shelf-life) when the stabilizing agent is a hindered amine light stabilizer with a hydrogen atom attached to the hindered nitrogen of the tetramethylpiperidinyl group; see e.g. Table 3 of US Patent Publication No US2013/033039, "Radiation Curable Ink Composition" (Nerad). Additionally, when formulating a UV-curable ink jet ink to include an oligomeric hindered amine light stabilizer, it is necessary to reduce the amount of other high viscosity ink components (such as, UV-curable oligomers or non-reactive resins) to meet the targeted jetting viscosity, which in turn may lead to a decrease in the mar resistance of the cured ink. Because of this viscosity limitation, in some instances, it is not possible to incorporate sufficient quantity of stabilizing agent into the base ink formulation in order to impart the desired durability to the graphic.

It has been discovered that an ink stabilizing agent, applied to the substrate just before or in conjunction with inkjet printing, may provide enhanced ink properties without the complexity of modifying the ink formulations. Such enhanced ink properties include improved durability by way of lessened susceptibility to fading and cracking e.g., the effects of light energy (particularly ultra-violet radiation typically encountered in outdoor installations). In one embodiment, the stabilizing agent is liquid and has not fully dried or cured before the application of ink, allowing the stabilizing agent, still considered wet, to mix with the ink. In one embodiment, an ink jetting process deposits droplets of stabilizing agent on a substrate in conjunction with depositing ink per the usual ink jet application techniques. This results in a mixing of stabilizing agent and the ink on the substrate. Ink areas that have not mixed are susceptible to migration of stabilizing agent over time, improving performance and durability. The ink jetting of the stabilizing agent may occur with a dedicated print head in advance of the print head that ink jets the actual ink (e.g., a the stabilizing agent is applied to the substrate in the printed area a few seconds to a few minutes before printing, in one embodiment as part of a common printing operation). Or the stabilizing agent may be deposited as part of the printing operation of one print head, with droplets of stabilizing agent interspersed with ink on the substrate. In such an embodiment, the stabilizing agent droplet may partially or fully overlap with one or more an ink droplets, either under a given ink droplet or above it, or next to it. The ratio of stabilizer agent to ink may be varied according to ink durability requirements. Also, some ink colors more susceptible to environmental degradation (e.g., more in need of stabilizing agents) may be mixed with a greater quantity of stabilizing agent. For example, magenta and yellow are generally more susceptible to fading than other colors; the process of the present invention in one embodiment allows a greater ratio of stabilizing agent to be deposited with these colors than with other colors. Some colors may not need stabilizing agent at all. Because the stabilizing agent is ink jetted, the coordinates of droplets may be tailored to printed areas—e.g., it is not necessary to coat the entire substrate, thus preserving stabilizing agent use.

FIG. 1 is a drawing of film 10 that includes an inkjet deposited stabilizing agent. Substrate 30 is shown with stabilizing agent droplets 20 underlying ink droplets 22. In such an embodiment, the stabilizing agent droplets 20 are deposited by ink jet before the ink droplets 22. In a preferred embodiment, the stabilizing agents are still in liquid form when the ink jet is deposited, to promote mixing of the stabilizing agent and the ink. In another embodiment, shown in FIG. 2, the stabilizing agent droplets 20 are interspersed with ink droplets 22, as would occur as part of a printing process whereby the stabilizing agent droplets are deposited as part of and concurrent with the ink jet printing process that deposits the ink droplets 22 (e.g., the same pass of the ink jet printing head(s) deposits droplets of stabilizing agent and ink, and such droplets may be overlapping fully or to some degree). In such a concurrent process, two, three, four, five or even more droplets of ink or stabilizing agent may be deposited upon each other. For example, the ink might comprise the second and fourth overlapping droplets, and the stabilizing agent might comprise the first and third droplets. The word "concurrent" as used in this disclosure means at very close temporal proximity, though not necessarily at the exact same time. It would include, for example, the use of the same print head operation to deliver both ink and stabilizing agent as separate materials. It could also include, however, the use of separate print heads, one associated with ink and another associated with stabilizing agent, that work as part of a single printing operation whereby there is the possibility of stabilizing agent being deposited on top of or below, or interspersed with, the ink. The particulars depend on the ink jet technology implementation.

Substrate 30 may be any film, membrane, or printable substrate suitable for image graphics applications using ink jet technology. Substrate 30 may comprise a single layer film, or it may comprise a compound film made up of two or more layers. In some embodiments, this invention permits use of films or membranes that otherwise would be difficult or unable to have environmental stabilizing agent(s) included therein. Typical polymeric materials suitable for use as substrate 30, which may be rigid or flexible, include polyolefins, polyesters, polyurethanes, ethylene vinyl acetates, acrylic polymers, polymerized vinyl compounds (polyvinyl chloride, polystyrene, polyvinyl butyral, etc.), modified cellulose (cellulose acetate, etc.), and blends and copolymers thereof. 3M Company of St. Paul, Minn. markets a wide variety of films and membranes that may be found suitable.

Stabilizing agent 20 may comprise one or more compounds. It may be an ultraviolet absorber, such as those sold under the Tinuvin® and Hostavin® trade names. It may be a hindered amine light stabilizer, such as those sold under the Tinuvin® and Hostavin® trade names. For improving the outdoor durability of the inks printed thereupon, it is preferred that the ink stabilizing agent 20 be an ultraviolet absorber or a hindered amine light stabilizer. Ink stabilizing agent 20 may be incorporated into a further composition. The further composition could be solvent-based, water-based, UV-curable, or a combination thereof. When the stabilizing agent is printed concurrently with the ink, it is preferred that both the ink and the further composition be of the same type; e.g. both are water-based. In addition to being the vehicle for the stabilizing agent, the further composition could provide additional desired attributes to the graphic such as promoting adhesion to the substrate, increasing the mar or scratch resistance, increasing the flexibility/elongation, speeding up the cure rate, improving color density, enhancing wetting of the substrate, etc. The use of a further stabilizing agent applied via ink jet as described herein does not preclude the use of further stabilizing agents in the ink itself.

By itself, the ink stabilizing agent 20 may be a solid or more preferably a liquid at room temperature (ca. 20 C). The ink stabilizing agent 20 may be incorporated as a solid, liquid, dispersion, emulsion, solution, etc. Examples of potentially suitable liquid ultraviolet absorbers include Tinuvin® 99-2, 109, 171, 384-2, 400, 477, and 1130. Examples of potentially suitable liquid hindered amine light stabilizers include Tinuvin® 123, 292, 5100, Hostavin® 3050, 3052, 3053, 3055, 3058, 3065, and 3068.

Figure 3:
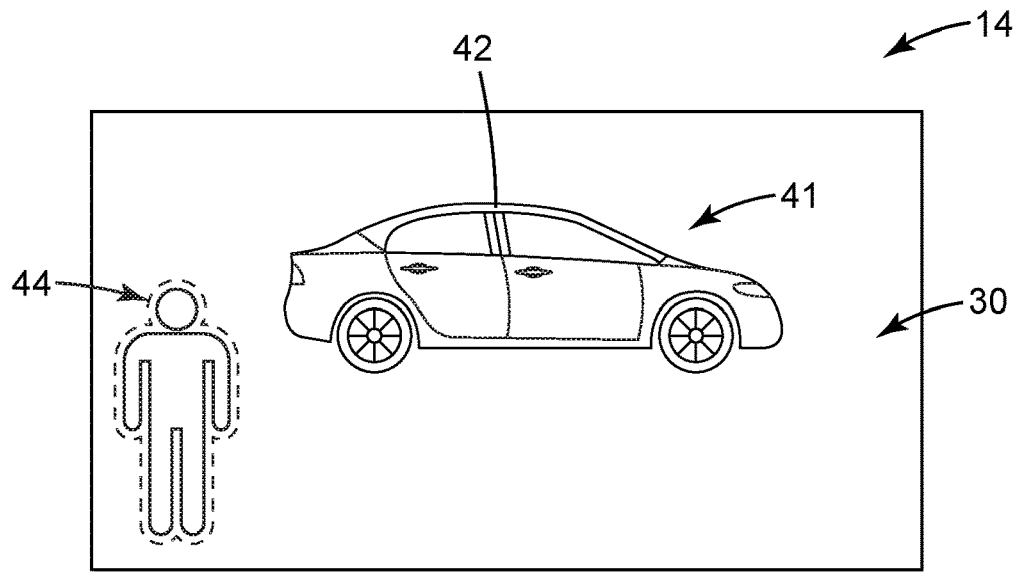
FIG. 3 is a drawing of a printed graphic having two pictures printed thereon, each picture having been printed in proximity to an ink stabilizing agent.

FIG. 3 is a plan view of a printed graphic 14, which has two printed graphics, person 44 and car 41, printed on substrate 30 vis-a-vis either of the processes mentioned above. Substrate 30 may be any suitable one, but in this example it is polyvinyl chloride. The area under person 44 has been pre-printed with stabilizing agent 20 in advance of printing of the person. The area so printed with ink stabilizing agent 20 is shown as extending somewhat beyond the printed area (dotted lines), which may occur to a small degree, but in practice the area that may be printed with ink stabilizing agent 20 should have, for all practical purposes, common edges with the ink that is printed. In some embodiments, however, the stabilizing agent intentionally extends beyond the boundary of the area intended to be printed somewhat.

Figure 2:
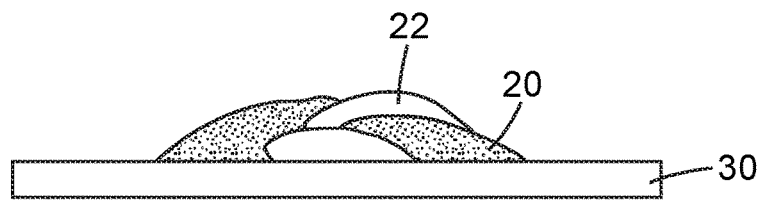
FIG. 2 is a profile view drawing of a substrate printed with an ink stabilizing agent and an ink in a concurrent process.

Vehicle 41 is printed with concurrent stabilizing deposition process outlined above in reference to FIG. 2. Vehicle 41 is represented as a black line drawing, but it may be printed according to this disclosure with a magenta printed top 42, a color notoriously susceptible to fading due to weathering. The rest of the vehicle, for the purposes of illustration, may be considered cyan or black, colors less susceptible to fading due to weathering. Before printing, in one embodiment a computer algorithm analyzes the image to be printed, and areas that are to be associated with inks requiring a higher amount of stabilizing agent are identified. Instructions are then sent to the printer to dispose stabilizing agent according to the analysis. The cyan and black body of vehicle 41 is printed with a first relative amount, or ratio, of stabilizing agent droplets interspersed with the ink droplets that comprise the cyan and black colors. This ratio may be, e.g., 10% (the particular level is dependent on ultimate performance characteristics). The magenta printed top 42, however, includes a higher relative amount, or ratio, of stabilizing agent to ink. For example, it may be 40% or 50% or higher. For example, in a region of the graphic where all the addressable pixels are printed solely with magenta ink, only half the pixels are printed with the stabilizing agent; and in a second region where only half the pixels are printed solely with magenta, all the pixels are printed with stabilizing agent as lower color density regions tend to fade faster; and in a third region where all pixels are printed solely with both magenta and cyan inks, only one-third of the pixels are printed with the stabilizing agent as the cyan ink provides some protection to the magenta ink. In this way, the specific durability requirements for particular ink colors, or blends of colors, may be used to apportion stabilizing agent to the ink according to durability requirements, during the printing process. The ink droplets mix with the stabilizing agent droplets upon substrate 30. Areas of ink not mixed may receive durability benefits through migration of compounds that occurs due to the proximity of the deposited ink and the stabilizing agent, over time.

The ink that comprises printed graphic layer 40 is disposed by an ink jet ink printer. When the stabilizing agent is delivered via an ink jet print head(s), the enhancement material may be jetted prior to and/or concurrent with the jetting of the ink. Additionally, in another embodiment, ink stabilizer agent may be applied via ink jet over the printed area, after the area is printed. Such a post-image printing step could be combined with the pre-printing and concurrent deposition techniques described above.

Embodiments Described Herein:

1. A method of improving the performance of an ink jet printed ink that is applied to a substrate having first and second major surfaces, comprising:
   applying, using a first ink jet print head, ink stabilizing agent to a first print area on the first major surface of the substrate;
   applying ink to the first print area.

2. The method of embodiment 1, wherein the ink stabilizing agent is a liquid.

3. The method of any of the preceding embodiments, wherein the ink and the stabilizing agent are applied concurrently.

4. The method of embodiment 3, wherein concurrently comprises a process wherein stabilizing agent droplets are applied with separate nozzles within in a common print head.

5. The method of embodiment 3, wherein concurrently comprises a process wherein stabilizing agent droplets are applied with ink droplets applied over or under the stabilizing agent droplets.

6. The method of any of the preceding embodiments, wherein in the ink is applied using a second ink jet print head.

7. The method of any of the preceding embodiments, wherein the ink is applied using the first ink jet print head.

8. The method of any of the preceding embodiments, wherein the ink is applied after the stabilizing agent has been applied to the first print area, and the ink stabilizing area is still a liquid at the time the ink is applied.

9. The method of any of the preceding embodiments, further comprising:
   allowing the applied ink to mix with the applied ink stabilizing agent at the first print area.

10. The method of embodiment 9, further comprising:
    curing or drying the ink.

11. The method of embodiment 10, wherein curing the ink comprises exposing the ink to radiation.

12. The method of any of the preceding embodiments, wherein the ink stabilizing agent applied to the first print area is in a first proportion, and further comprising:
    applying ink stabilizing agent to a second print area on the first major surface of the substrate, and wherein the ink stabilizing agent applied to the second print area is in a second proportion, and,
    applying ink to the second print area.

13. The method of embodiment 12, further comprising:
    applying ink stabilizing agent to a third area of the first major surface of the substrate, and wherein the ink stabilizing agent applied to the third print area is in a third proportion; and,
    applying ink to the third print area.

14. The method of embodiment 12, wherein the first proportion and second proportion are different.

15. The method of embodiment 12, wherein the first proportion and second proportion comprise the amount of ink stabilizing agent divided by the area to which the ink stabilizing agent is applied.

16. The method of embodiment 12, wherein the first print area comprises an area to be printed with an ink formulation that is known to be more susceptible to fading due to weathering than another ink formulation, and wherein the second print area comprises an area to be printed with an ink formulation that is known to be less susceptible to fading due to weathering than the ink formulation used to print the first print area.

17. The method of any of the preceding embodiments, wherein the ink stabilizing agent does not contain ink.

18. A method of improving the performance of an ink jet printed ink that is applied to a substrate, comprising:
   using ink jet technology, applying a first amount of ink stabilizing agent to a first print area associated with a first color;
   using ink jet technology, applying a second amount of ink stabilizing agent to a second print area associated with a second color;
   printing, using ink jet technology, the first color in the first print area and the second color in the second print area.

19. The method of embodiment 18, wherein the first amount and second amount differ by over 10%.

20. The method of embodiment 18-19, wherein the printing step is concurrent with the associated ink jet application step.

21. The method of embodiment 18-20, wherein the printing step occurs after the ink stabilizing agent has been applied the first and second areas, but wherein the stabilizing agent is still at least partially liquid during the printing step.

22. A computer-implemented method comprising:
   analyzing a graphic to be printed to identify areas of the graphic that are more prone to weathering;
   controlling an ink jet print head to apply ink stabilizing agent varied according to the analysis, with more stabilizing agent applied to areas that are more prone to weathering.

23. An ink jet printed article having a printed surface, comprising:
   a first area on the printed surface wherein a stabilizing agent and a separate ink have been deposited according to an ink jet process.

24. The ink jet printed article of embodiment 23, wherein the first area is associated with a first ink and a first relative amount of stabilizing agent, and further comprising:
   a second area on the printed surface, wherein a second ink and second relative amount of stabilizing agent have been deposited according to an ink jet process.

25. The ink jet printed article of embodiment 23-24, wherein the first relative amount of stabilizing agent and the second relative amount of stabilizing agent differ by greater than 10%.

26. The ink jet printed article of embodiment 23-25, wherein the first relative amount of stabilizing agent and the second relative amount of stabilizing agent differ by greater than 20%.

27. The ink jet printed article of embodiment 23-25, wherein the first relative amount of stabilizing agent and the second relative amount of stabilizing agent differ by less than 10% but more than 2%.

28. The ink jet printed article of embodiment 24, wherein the first relative amount of stabilizing agent and the second relative amount of stabilizing agent are determined by a computer algorithm before printing.

29. The ink jet printed article of embodiment 24, wherein the first printed area comprises a first color, and the second printed area comprises a second color.

30. The ink jet printed article of embodiment 24, wherein the stabilizing agent and the separate ink have been deposited in the first area by a process whereby the stabilizing agent is first deposited by ink jet, then before the stabilizing agent has fully dried or cured, the separate ink is deposited by ink jet.

31. The ink jet printed article of embodiment 24, wherein the stabilizing agent and the separate ink have been deposited in the first area by a process whereby the stabilizing agent is deposited concurrently to the deposition of the separate ink.

The invention claimed is:

1. A method of improving the performance of an ink jet printed ink that is applied to a substrate having first and second major surfaces, comprising:
   applying, using a first ink jet print head, ink stabilizing agent to a first print area on the first major surface of the substrate, wherein the ink stabilizing agent is an ultraviolet absorber or a hindered amine light stabilizer;
   applying ink to the first print area;
   wherein the ink and the stabilizing agent are applied concurrently.

2. The method of claim 1, wherein concurrently comprises a process wherein stabilizing agent droplets are applied with separate nozzles within in a common print head.

3. The method of claim 1, wherein concurrently comprises a process wherein stabilizing agent droplets are applied with ink droplets applied over or under the stabilizing agent droplets.

4. The method of claim 1, further comprising:
   allowing the applied ink to mix with the applied ink stabilizing agent at the first print area.

5. The method of claim 4, further comprising:
   curing or drying the ink.

6. The method of claim 5, wherein curing the ink comprises exposing the ink to radiation.

7. The method of claim 1, wherein the ink stabilizing agent applied to the first print area is in a first proportion, and further comprising:
   applying ink stabilizing agent to a second print area on the first major surface of the substrate, and wherein the ink stabilizing agent applied to the second print area is in a second proportion, and,
   applying ink to the second print area.

8. The method of claim 7, further comprising:
   applying ink stabilizing agent to a third area of the first major surface of the substrate, and wherein the ink stabilizing agent applied to the third print area is in a third proportion; and,
   applying ink to the third print area.

9. A method of improving the performance of an ink jet printed ink that is applied to a substrate, comprising:
   using ink jet technology, applying a first amount of ink stabilizing agent to a first print area associated with a first color;
   using ink jet technology, applying a second amount of ink stabilizing agent to a second print area associated with a second color;
   printing, using ink jet technology, the first color in the first print area and the second color in the second print area;
   wherein the ink stabilizing agent is an ultraviolet absorber or a hindered amine light stabilizer;
   wherein the printing step is concurrent with the associated ink jet application step.

10. The method of claim 9, wherein the first amount and second amount differ by over 10%.

11. The method of claim 9, wherein the printing step occurs after the ink stabilizing agent has been applied the first and second areas, but wherein the stabilizing agent is still at least partially liquid during the printing step.

* * * * *